United States Patent [19]
Roman

[11] Patent Number: 5,101,859
[45] Date of Patent: Apr. 7, 1992

[54] PROGRAMMABLE ELECTRONIC CONTROL UNIT FOR WATER DISTRIBUTION SYSTEMS, PARTICULARLY FOR THE IRRIGATION OF GARDENS, LAWNS, KITCHEN GARDENS, TERRACES AND BALCONIES

[75] Inventor: Gianfranco Roman, Pasiano, Italy

[73] Assignee: Claber S.p.A., Italy

[21] Appl. No.: 722,002

[22] Filed: Jun. 27, 1991

[30] Foreign Application Priority Data

Aug. 2, 1990 [IT] Italy ................ 21180 A/90

[51] Int. Cl.$^5$ .......................................... A01G 27/00
[52] U.S. Cl. ......................... 137/624.18; 137/624.2; 137/625.11
[58] Field of Search ............ 137/624.11, 624, 12, 137/624, 18, 624.2, 625.11

[56] References Cited

U.S. PATENT DOCUMENTS

| | | | |
|---|---|---|---|
| 2,641,280 | 6/1953 | Fleischbauer | 137/625.11 X |
| 4,310,002 | 1/1982 | Cohen | 137/624.11 X |
| 4,708,162 | 11/1987 | Bayat | 137/624.18 X |
| 4,807,664 | 2/1989 | Wilson | 137/624.11 |

Primary Examiner—Alan Cohan
Attorney, Agent, or Firm—Eckert Seamans Cherin & Mellott

[57] ABSTRACT

The control unit comprises a hollow external casing, an internal bolt rotatable in an internal cavity of said external casing to close and alternately to place in communication with a plurality of different transversal outlets a water inlet obtained axially in said bolt, a reversible electric motor for the rotation of said bolt, a cam element rotatable together with said bolt, and a plurality of electric limit switches co-operating with said cam element. An electronic control circuit with programmable times is provided to operate said electric motor in one direction or the other and up to the engagement of said cam element with one predetermined of said limit switches for the consequent displacement of the bolt in a position of closing said axial inlet or of placing it in communication with one of said transversal outlets. Electric batteries supply power to said electronic circuit and to said electric motor. A control keyboard housed in an accessible space of said external casing is connected electrically to said electronic control circuit to allow the programming of the times and methods of operation of said motor.

6 Claims, 4 Drawing Sheets

PROGRAMMABLE ELECTRONIC CONTROL UNIT FOR WATER DISTRIBUTION SYSTEMS, PARTICULARLY FOR THE IRRIGATION OF GARDENS, LAWNS, KITCHEN GARDENS, TERRACES AND BALCONIES

DESCRIPTION

The present invention relates to a programmable electronic control unit for water distribution systems, particularly for the irrigation of gardens, lawns, kitchen gardens, terraces and balconies.

The habit is gaining ground of programming the time of distribution of water for the irrigation of green spaces, so as to also exploit the hours when the owner is absent and those at night.

The manufacturers of garden articles have therefore devoted themselves to the design and manufacture of programmable control units which allow the user to programme one or more interventions of the irrigating system over the course of a day with the possible repetition over several days of a week.

The battery-operated control units known up to now are destined for the control of a single irrigation system. Several systems thus require an equal number of control units, each with a programme of its own.

The object of the present invention has been that of accomplishing a battery-operated programmable electronic control unit which is to be in the position of operating several irrigation systems independently, while also being free of any construction constraint as regards a specific sequence of interventions of the systems under control.

In view of such objects the programmable electronic control unit according to the invention is characterized essentially in that it comprises a hollow external casing, an internal bolt rotatable in an internal cavity of said external casing to close and alternately to place in communication with a plurality of different transversal outlets a water inlet obtained axially in said bolt, a reversible electric motor for the rotation of said bolt, a cam element rotatable together with said bolt, a plurality of electric limit switches co-operating with said cam element, an electronic control circuit with programmable times to operate said electric motor in one direction or the other and up to the engagement of said cam element with one predetermined of said limit switches for the consequent displacement of the bolt in a position of closing said axial inlet or of placing it in communication with one of said transversal outlets, electric batteries for supplying power to said electronic circuit and to said electric motor, and a control keyboard housed in an accessible space of said external casing and connected electrically to said electronic control circuit to allow the programming of the times and methods of operation of said motor.

In this way a control unit has been obtained which through the opening and placing in communication of the single water inlet with one or the other of its distribution outlets, is in a position of simultaneously operating several distribution systems, one for each of the abovementioned outlets. It shall be sufficient to programme the control unit so that the bolt is arranged in the position for distributing water to a particular system for the times desired, clearly different from those of distribution to the other systems. The reversibility of the motor operating the bolt, on the other hand, allows the entirely free setting of the sequence of activation of the different systems without any constraint determined previously by construction or functional questions. A suitable software for operating the electronic control circuit thus allows the user to set any desired programme for the entire complex of irrigation systems.

These and other features of the present invention shall be made evident by the following detailed description of an embodiment illustrated as a non-limiting example in the enclosed drawings, wherein.

Figure 1:
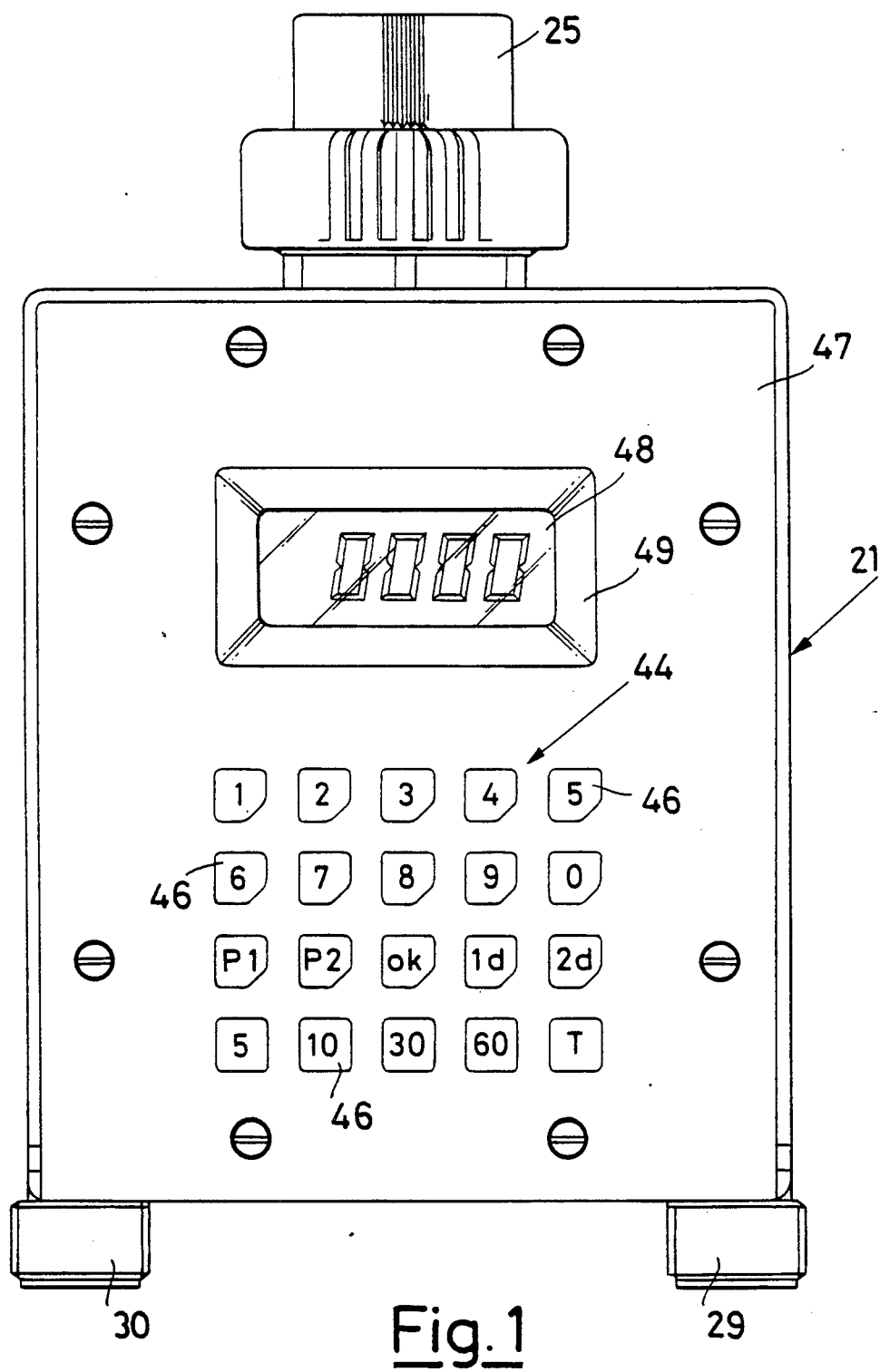
FIG. 1 shows a front view of an electronic control unit according to the invention.

The control unit shown in the drawings comprises a finned external casing or shell 21, inside which there are defined several housing cavities for the control unit's operating organs.

Figure 3:
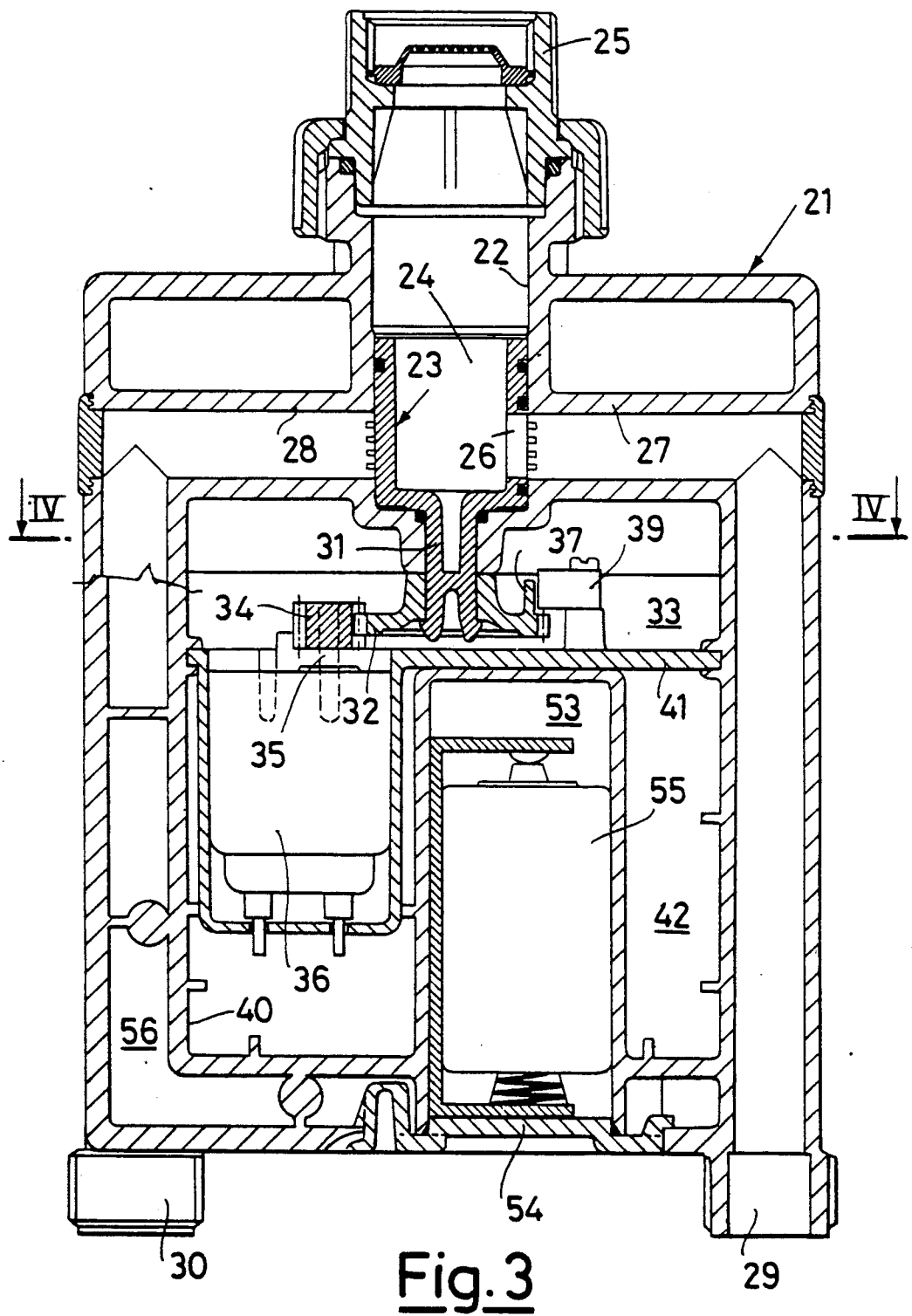
FIG. 3 shows said control unit in a sectional view taken along the line III—III of FIG. 2.

In particular, as shown in FIG. 3, there is a cylindrical cavity 22 in which there is rotatably housed a cylindrical bolt 23 having an axial water inlet 24 in constant communication with an inlet port 25 obtained in the external casing 21 and a lateral outlet 26 which according to the angular position of the bolt 23 can be either closed or placed in communication with two outlet conduits 27, 28 arranged transversally, leading to respective distribution ports 29, 30.

Figure 4:
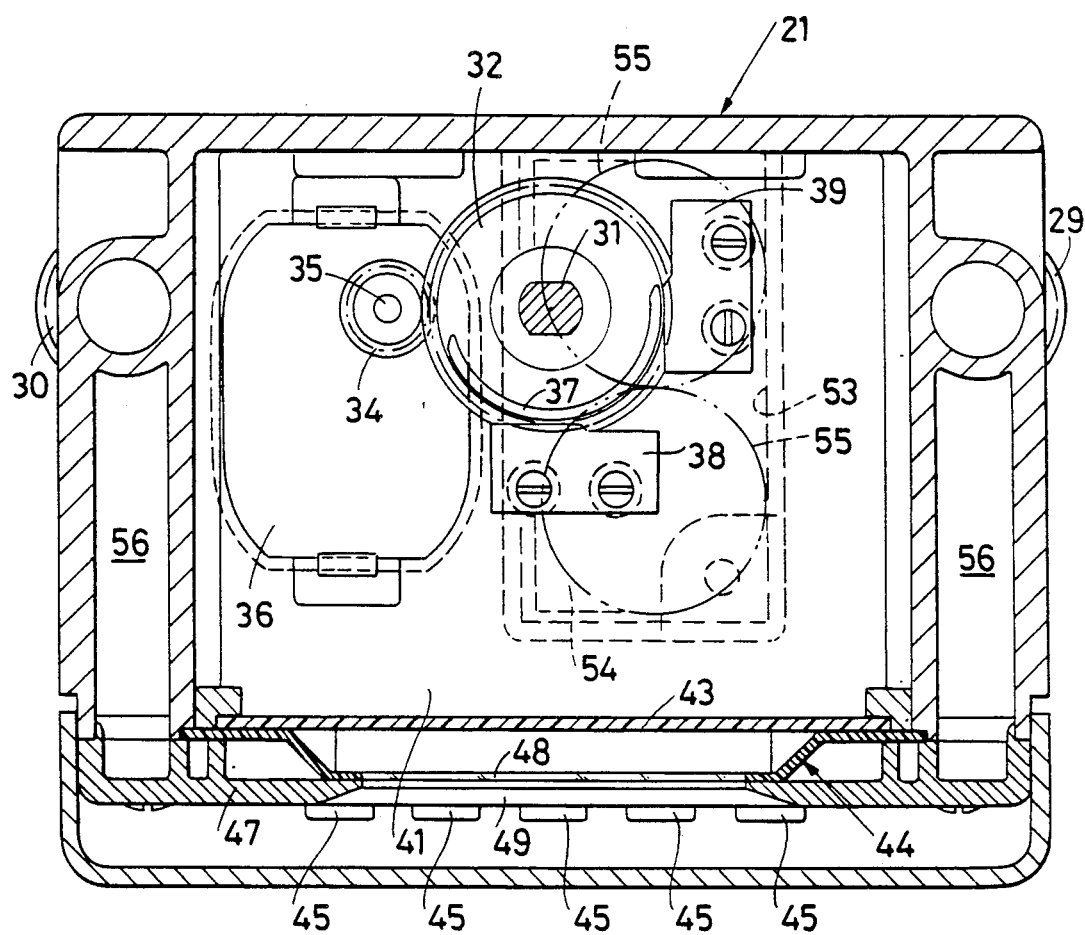
FIG. 4 shows said control unit in a sectional view taken along the line IV—IV of FIG. 2.

The bolt 23 has a protruding tang 31, to which there is connected a larger gear 32 housed in another cavity 33 of the external casing 21 and in engagement with a smaller gear 34 mounted on the output shaft of an electric motor set 36. With the larger gear 32 there is accomplished in a single piece a cam element 37 which, as also shown in FIG. 4, co-operates with two electrical limit switches 38 and 39 arranged at fixed circumferentially distanced positions so as to limit, as shall be explained later, the rotational movements imparted from time to time by the motor 36 to the bolt 23.

The motor set 36 is housed in a niche 40 of an intermediate frame 41 that supports the limit switches 38 and 39 and is snap-connected to the external casing 21. As shown in FIG. 3, the frame 41 functions as a cover of a further internal cavity 42 in which there are housed several electrical connections (not shown) and which is closed laterally by a printed circuit board 43 which functions as the base for the different components (also not shown) of an electronic control circuit associated with the motor 36 and with the limit switches 38 and 39.

Figure 2:
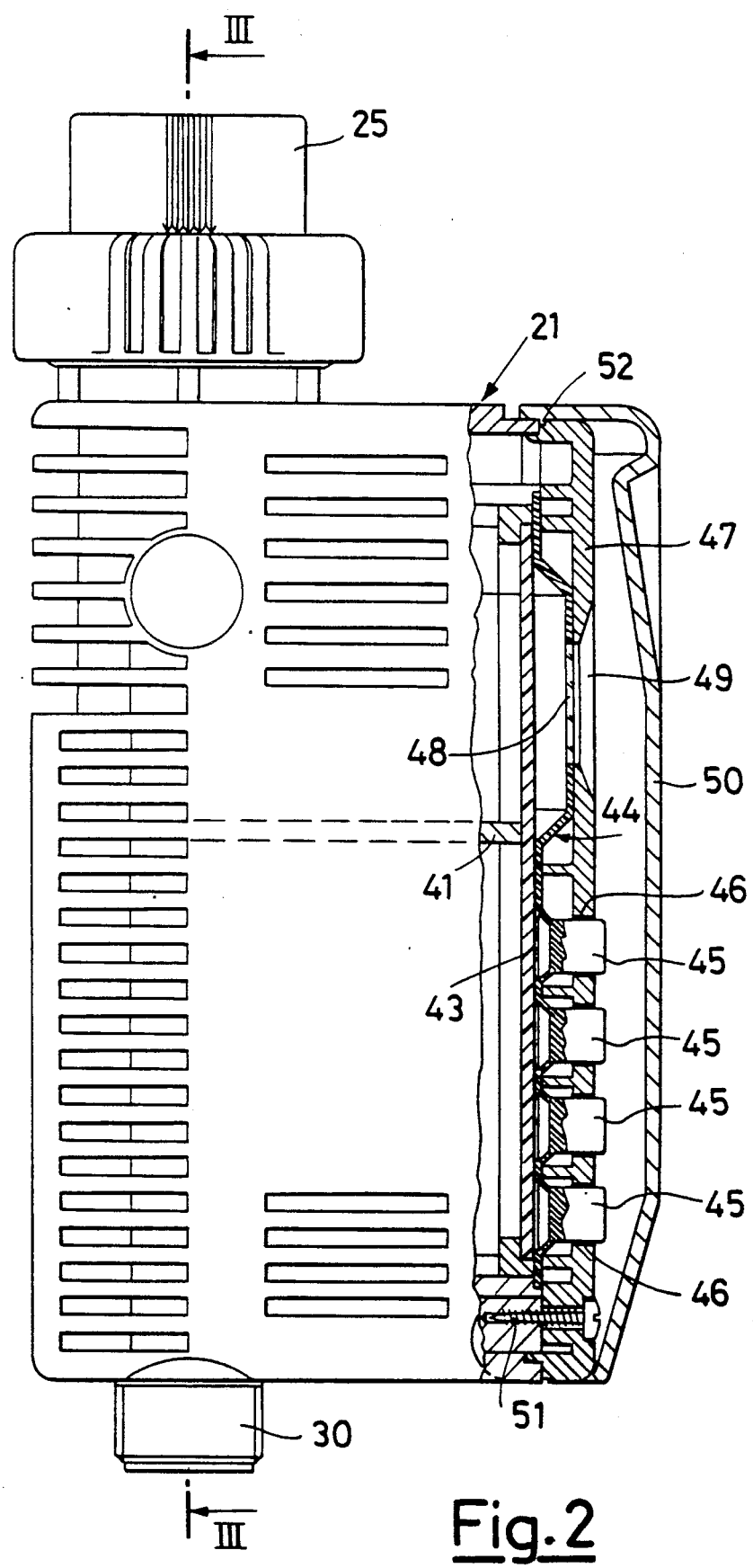
FIG. 2 shows said control unit in a partially-sectioned lateral view.

In front of the board 43 with its corresponding electronic components there is a keyboard 44 comprising in a single piece of flexible plastic material twenty programming keys 45 slidably passing through respective holes 46 of a front panel 47 fastened to the external casing 21 (FIG. 2) and provided with corresponding alpha-numeric markings (FIG. 1), and a transparent numerical display part 48 arranged at a small window 49 in the abovementioned front panel 47. Due to the effect of its physical constitution and to its arrangement in front of the board 43 the keyboard 44 also functions as a hydraulic sealing element for the electronic and electro-mechanical parts behind it. A cover 50 hinged at 51 on the external casing 21 and also snap-connected with it and with the front panel 47 at 52 is provided to define with the external casing 21 a space for housing and protecting the keyboard 44 during the periods when the keyboard itself is not in use.

Still inside the casing 21, in a cavity 53 closed underneath by a snap cover 54 (FIGS. 3 and 4), there are two electric power supply batteries 55 suitably connected by means not shown to the motor 36 and to the electronic control circuit. If desired, the snap cover 54 could be replaced by a screw-down cover with a seal so as to completely insulate the battery space 53 from the water round it.

There is finally in the casing 21 of the control unit an interspace 56 suitable for constituting ventilation shafts for the elimination of heat produced by the batteries 53 and by the motor 36 and thus for avoiding any internal overheating.

With a suitable software associated with the electronic control circuit the electronic control unit illustrated in the drawings ia destined to be operated as follows.

Once the irrigation systems have been connected to the two distribution ports 29 and 30 and the desired programme times have been set with the keys 45 of the keyboard 44, the electronic control circuit operates so that when the moment arrives for the activation of a given system the electric motor 36 is operated in a direction such as to displace the bolt 23 in as short a time as possible from the normal closed position to the position where it opens the communication between the water inlet port 25 and the selected distribution port 29 or 30 for the consequent activation of the system connected to it. The rotation of the bolt stops when the cam element 37 reaches the appropriate limit switch 38 or 39.

After a time programmed with the keyboard 44, the electronic control circuit once more activates the motor 36 so as to cause it again to rotate the bolt towards a new closed position or, according to the pre-set programme, towards the position of opening of the communication between the water inlet port 25 and the other distribution port 30 or 29 for the consequent activation of the system connected to it.

The reversibility of rotation of the motor 36, as already said, allows the modification at will of the sequence of activation of the irrigation systems, and this even in the case wherein there are more than two systems connected, obviously, to a corresponding number of distribution ports suitably arranged even in a large number instead of the two (29 and 30) present in the control unit illustrated as an example in the drawings.

The necessary hydraulic seal is ensured, as already said, by the constitution and arrangement of the single-piece keyboard 44, and possibly by the small closing cover 54 of the battery space 53.

The ventilation shafts 56 prevent any internal overheating due to the batteries 53 and to the activation of the motor 36.

I claim:

1. Programmable electronic control unit for water distribution systems, particularly for the irrigation of gardens, lawns, kitchen gardens, terraces and balconies, characterized in that it comprises a hollow external casing, an internal bolt rotatable in an internal cavity of said external casing to close and alternately to place in communication with a plurality of different transversal outlets a water inlet obtained axially in said bolt, a reversible electric motor for the rotation of said bolt, a cam element rotatable together with said bolt, a plurality of electric limit switches co-operating with said cam element, an electronic control circuit with programmable times to operate said electric motor in one direction or the other and up to the engagement of said cam element with one predetermined of said limit switches for the consequent displacement of the bolt in a position of closing said axial inlet or of placing it in communication with one of said transversal outlets, electric batteries for supplying power to said electronic circuit and to said electric motor, and a control keyboard housed in an accessible space of said external casing and connected electrically to said electronic control circuit to allow the programming of the times and methods of operation of said motor.

2. Programmable electronic control unit according to claim 1, characterised in that said electronic control circuit is positioned so as to close a further internal cavity of said external casing and said keyboard is accomplished in a single casing of flexible plastic material suitable for accomplishing a hydraulic seal for said electronic control circuit.

3. Programmable electronic control unit according to claim 1, characterised in that said space for housing the keyboard is provided with a closing cover.

4. Programmable electronic control unit according to claim 1, characterised in that said electric batteries are housed in a battery space provided with a small openable closing cover.

5. Programmable electronic control unit according to claim 4, characterised in that said small closing cover is of the screw type with a seal.

6. Programmable electronic control unit according to claim 1, characterised in that said external casing is provided with an interspace suitable for defining ventilation shafts for the elimination of heat.

* * * * *